United States Patent [19]

Jackson et al.

[11] 4,359,233
[45] Nov. 16, 1982

[54] MOTORCYCLE TANK BAG MOUNTING ARRANGEMENT

[76] Inventors: W. Shaun Jackson, 809 Sycamore, Ann Arbor, Mich. 48104; Leslie E. Bohm, 29560 Rutherland, Southfield, Mich. 48076

[21] Appl. No.: 170,430

[22] Filed: Jul. 21, 1980

[51] Int. Cl.³ ............................................... B62J 7/02
[52] U.S. Cl. .............................. 280/289 A; 224/32 R
[58] Field of Search .............. 280/289 A, 289 R, 202; 224/30 R, 32 R, 32 A, 35, 42

[56] References Cited

U.S. PATENT DOCUMENTS

| 4,003,508 | 1/1977 | Hoops | 224/32 R |
|---|---|---|---|
| 4,059,207 | 11/1977 | Jackson et al. | 280/289 A |
| 4,258,869 | 3/1981 | Hilgendorff | 224/32 A |

FOREIGN PATENT DOCUMENTS

| 2234173 | 1/1975 | France | 224/32 R |
|---|---|---|---|
| 7921587 | 4/1980 | France | 224/32 R |
| 877460 | 7/1961 | United Kingdom | 224/32 R |

Primary Examiner—Joseph F. Peters, Jr.
Assistant Examiner—Donn McGiehan
Attorney, Agent, or Firm—Krass, Young & Schivley

[57] ABSTRACT

A motorcycle tank bag mounting arrangement is disclosed consisting of front and rear harnesses adpted to be secured about the motorcycle frame members to the front and rear of the motorcycle tank. Quick disconnect fastener elements are carried by each harness adapted to mate with corresponding quick disconnect fastener elements secured to straps fastened to the bottom of the motorcycle tank bag providing a three-point retention. A motorcycle tank pad is positioned underneath the bottom of the tank bag by the tank bag straps passing through slits formed in the pad. Projecting tab portions of the tank pad underlie each of the bag and harness fastener elements to cushion the same on the tank surface.

10 Claims, 5 Drawing Figures

MOTORCYCLE TANK BAG MOUNTING ARRANGEMENT

BACKGROUND DISCUSSION

It is often convenient to motorcycle riders to have some means for stowing articles on the cycle, particularly in a position allowing ready access thereto without dismounting. With the motorcycle gasoline tank extending intermediate the seat and the steering head, the top surface presents a generally planar support surface.

Accordingly, it has heretofore been known to provide a stowage bag secured to the gasoline tank for this purpose.

Desirably, such installations of motorcycle tank bags should take into account several considerations. The bag should be able to be quickly and easily installed. After installation, the bag should be positioned relatively securely such as to not have any tendency to shift during maneuvers even when heavily loaded.

Also, the bag should be readily removable in order to provide access to the gas cap and also to enable the bag to be conveniently taken with the operator after dismounting.

The tank upper surface, while generally planar, usually includes a filler neck and cap for filling the tank with gasoline, which cap will have a tendency to damage fragile articles disposed in the bottom of the bag.

Similarly, the articles within the bag need to be protected from the projecting gas cap, and the surface finish of the tank may be damaged by relatively hard, sharp articles disposed within the bag scraping the surface of the gas tank. Likewise, the strap and bag fastener hardware is often located to mar the tank surface.

Accordingly, the simple encircling strap mounting arrangements and top mounted frames which have heretofore been utilized are not entirely satisfactory in dealing with all of these respects.

In U.S. Pat. No. 4,059,207 of the present inventors, there is disclosed a motorcycle tank bag and installation thereof including a harness mounting arrangement and tank pad which are mounted to the motorcycle gas tank, with a quick disconnect feature enabling ready removal of the tank bag from the harness arrangement. The tank pad protects the surface finish of the bag tank and also recesses the gas cap in an opening formed in the pad. This approach requires a relatively thick support pad in order to accommodate the depth of the filler neck and cap.

In addition, while quick disconnect fasteners are used, i.e., Velcro strips, there is a four-point connection between the harness and bag and it would of course be advantageous to further improve the speed with which the bag may be released from the supporting harness.

Also, typical methods for securing the bag to the tank have utilized a pair of encircling harness straps which pass around the gas tank. While relatively secure, it would be advantageous to provide a fore and aft and lateral tensioning of the bag in order to minimize any tendency for shifting of the bag position due to starting and stopping, acceleration and deceleration of the motorcycle.

The encircling arrangements heretofore employed have relied on the ability of these straps gripping the tank body to resist shifting on the tank surface, a not-always attainable result.

Accordingly, it is an object of the present invention to provide a relatively simple mounting arrangement for a motorcycle tank bag in which the bag may be speedily and readily detached and removed from the motorcycle.

It is a further object of the present invention to provide such mounting arrangement in which a tank pad is incorporated configured to protect the tank surface and also to provide an anti-friction surface increasing the stability of the mounting of the tank bag, which pad is relatively thin in construction but which is arranged so as to enable ready access to the gas filler cap.

It is yet another object of the present invention to provide such mounting arrangement in which extremely secure positioning of the tank bag both in fore and aft and lateral directions is afforded.

SUMMARY OF THE INVENTION

These and other objects of the present invention, which will become apparent upon a reading of the following specification and claims, are achieved by a mounting arrangement consisting of front and rear strap harnesses. The front harness includes a front harness strap adapted to be installed encircling the motorcycle frame at a point just below the steering head with an elastic retaining strap passing over the top of the gasoline tank securing ends of the front harness strap in position.

The ends of the front harness strap are each provided with quick disconnect fastener elements which are maintained in position by the elastic straps on the top surface of the tank on either side thereof.

The rear harness consists of an encircling rear harness strap which is adapted to be passed around the motorcycle frame at a point intermediate the rear end of the tank and the motorcycle seat, the ends thereof carrying an element of a quick disconnect fastener.

The motorcycle tank bag is provided with a corresponding pair of front located mating quick disconnect fastener elements positioned to be mated with the front harness fastener elements and a rear located element adapted to be mated with the rear harness fastener element to provide a three-point connection of the bag to the motorcycle frame. Tensioning buckles are included on either end of the front harness strap and on the rear harness strap to enable fore and aft and lateral tensioning of the bag, acting through the fastener elements.

Each of the bag-carried fastener elements is secured by means of short straps sewn into the bag which pass through slits formed in an underlying tank pad of relatively thin resilient material configured to cover the bottom of the bag and having a plurality of tab portions located to underlie the connected fastener elements after installation thereof to protect the tank surface in contact therewith.

After installation of the tank bag, the front and rear harness straps are tightened by use of the buckles so as to provide a taut connection of the bag with respect to the motorcycle frame.

The bag and pad are quickly disconnected by manipulation of the quick release fasteners leaving only the front and rear harnesses in place such as to allow quick removal of the tank bag or to enable ready access to the filler cap.

The bag is thus directly positioned by direct connection with the motorcycle frame to very securely position the bag in its installed position.

DETAILED DESCRIPTION

Figure 1:
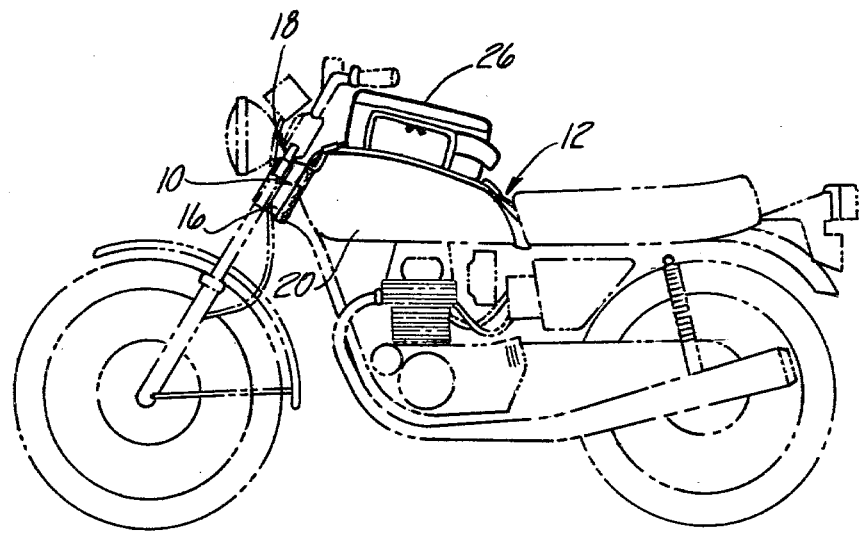
FIG. 1 is a side elevational view of the mounting arrangement according to the present invention installed showing portions of a motorcycle and the relationship of these components with a motorcycle tank bag and pad.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, the mounting arrangement includes a front harness 10 and a rear harness 12, the front harness 10 including a front harness strap 14 of suitable material such as a high strength nylon weave and is adapted to be positioned about the front motorcycle frame 16 just beneath the steering head 18 and to the front of the motorcycle gasoline tank 20. The front harness strap 14 carries on end portions a pair of male elements 22 of quick release fasteners, which elements 22 are adapted to mate with corresponding female elements 24 secured to the front of the tank bag 26 as will be described hereinafter in more detail.

These male elements 22 are retained by the ends of the front harness 10 being passed through suitable openings provided in the rear of the male elements 22 and passing thence into tension adjusting buckles 28.

To retain the front harness strap 14 in position encircling the gasoline tank 20 as shown, an elastic retaining strap 30 is provided as of neoprene rubber having head portions 32 formed with slots which may be received over the male elements 22 at installation thereof and which secures the front harness strap 14 with the male elements 22 positioned atop the gasoline tank 20 in a laterally spaced apart position.

The rear harness 12 is also provided with a rear harness strap 38 adapted to be encircled around the motorcycle frame members 40 at a point immediately to the rear of the gasoline tank 20 and passing upwardly over the rear surface of the gasoline tank 20 such as to be anchored in a way enabling the rear harness strap 38 to be tensioned. Rear harness 12 is also secured to male fastener element 42 by a looping of the rear harness strap 38 through a suitable opening on the rear thereof. Male fastener element 42 is adapted to mate with a female fastener element 44 of the quick disconnect fastener which is secured to the tank bag 26, as will be described hereinafter.

A rear tension adjusting buckle 34 enables the tensioning of the rear harness 12 by manipulation of the free ends 46 after installation of the tank bag 26.

The tank bag 26 is of closely woven nylon construction and is provided with front webbing loops 48 and rear webbing loops 50, each passing through openings 52 on each of the front female elements 24 and through a similar opening 54 of the female fastener element 44 to retain the same.

Figure 2:
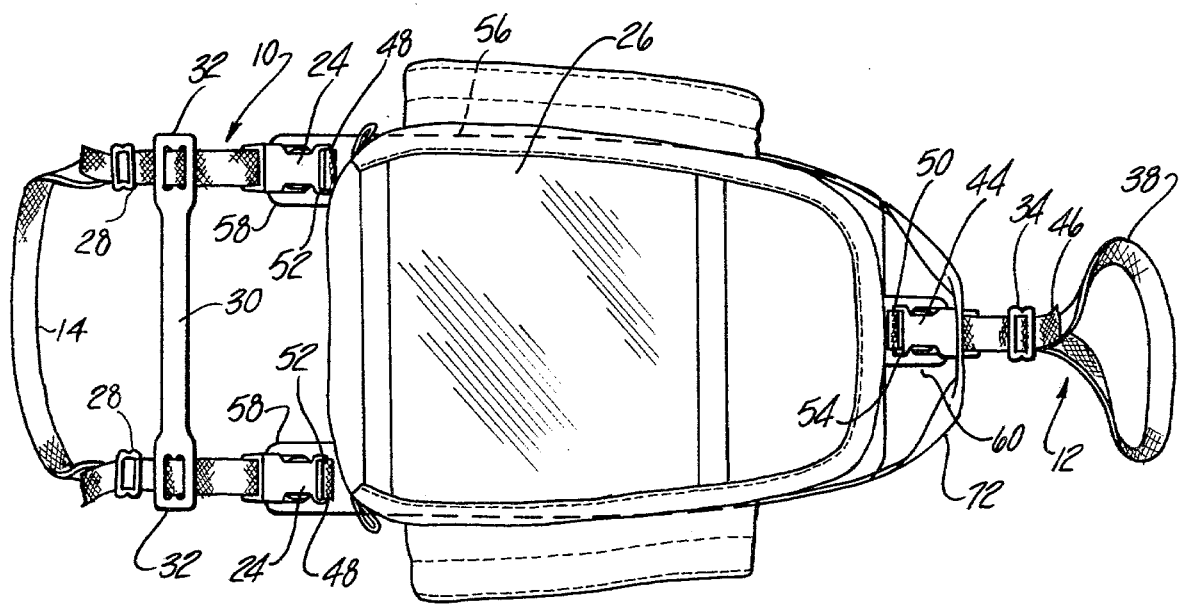
FIG. 2 is a plan view of the front and rear harnesses and bag and the mating components thereof shown in the installed position.
Figure 3:
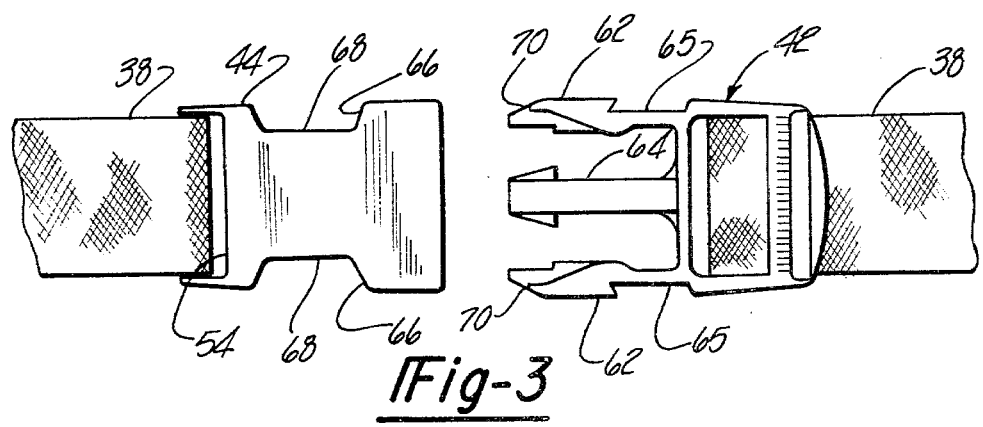
FIG. 3 is an enlarged view depicting one of the quick disconnect fastener mating elements in the separated position.
Figure 4:
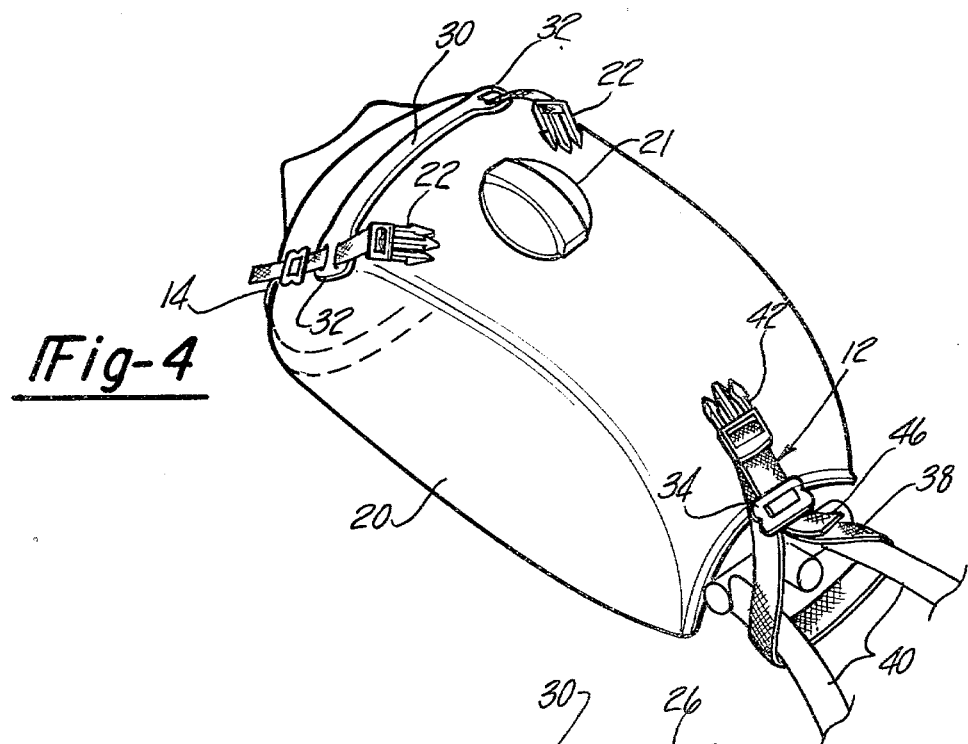
FIG. 4 is a view of portions of the motorcycle showing the front and rear harnesses in position after removal of the tank bag and pad.
Figure 5:
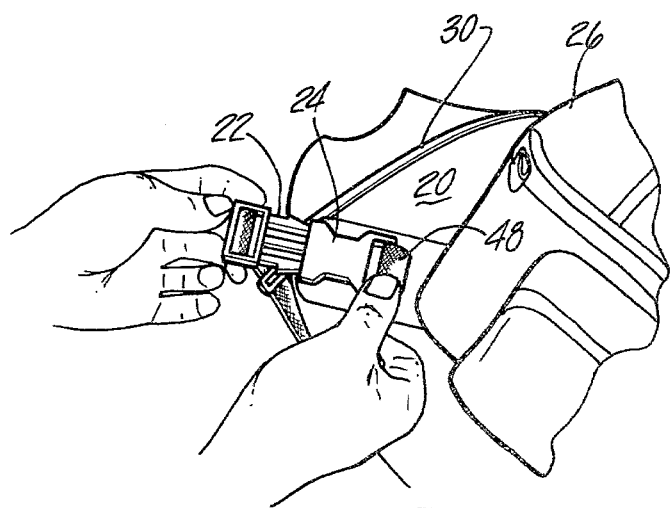
FIG. 5 is a perspective view of the tank bag being removed by release of the fasteners.

A resilient tank pad 56 is provided configured to generally underlie the bottom of the tank bag 26 and overlie the gasoline tank 20 and filler cap 21, and is carried in position with respect to the tank by the front webbing loops 48 and rear webbing loops 50 passing through slits formed in the tank pad 56 at appropriate locations, as shown in FIG. 2.

Tank pad 56 is also provided with a series of tap portions, two spaced tabs 58 on the front thereof and one tab 60 at the rear edge and in alignment with the respective webbing loops and fastener elements such as to underlie the connected male and female quick disconnect fastener elements 22, 24, 42 and 44 to protect the tank 20 from contact therewith.

The quick disconnect fastener elements consist of mating molded plastic male and female elements of a commercially available type, under the trademark FASTEX, Model SR-1 from Des Plaines, Ill. Each male fastener, as represented by rear element 42, is provided with a pair of outboard prongs 62 and a central locating prong 64. Each of the outboard prongs 62 is provided with an engagement cutout 65 which is adapted to spring into abutment with retaining edges 66 provided on the adjacent cutout 68 of the female fastener element 44 opening into a recess which is configured to receive both the outboard prongs 62 and the central locating prong 64.

The forward edge of the outboard prongs 62 includes a chamfered surface 70 such that the prongs are cammed together to enable passage into the opening, to be passed into the adjacent cutout 68 once the outboard prongs 62 spring back into position with the retaining edges 66, in abutment to secure the same in connected relationship.

To release, the outboard prongs 62 are squeezed together, access thereto being provided by the adjacent cutout 68, such that the male element 42 may be withdrawn for quick release.

To install the harnesses, the front harness 10 is positioned with the front harness strap 14 passing under the motorcycle frame 16 as noted and installing the elastic retaining strap 30 such as to secure the male fastener elements 42 in position. The rear harness 12 is then installed encircling the motorcycle frame members 40 with the male fastener element 42 in position centrally located on the rear surface of the gasoline tank 20.

The tank bag 26 and attached pad 56 are then placed in position atop the gasoline tank 20, and connection is made with the various male and female quick disconnect elements to provide a three-point securement. The tension adjusting buckles 28 are thence tightened to provide lateral positioning and tension on the tank bag 26 with the final tensioning of the rear tension adjusting buckle 34 affording fore and aft stability of the bag and tensioning thereof such as to provide a very secure direct connection of the tank bag 26 with the frame members.

To remove the tank bag 26, the quick release fasteners are simply released after which the bag is free to be carried with the operator. A front carrying strap 72 is provided which enables the tank bag 26 to be conveniently carried together with the tank pad 56.

It can be appreciated that a minimum number of fastening points is incorporated, i.e., the three-point connection, which connection provides for direct tensioning of the bag fore and aft and laterally to provide very secure retention thereof, resisting any tendency for shifting of the bag on the tank surface despite maneuvers by the motorcycle operator, even with the tank bag 26 heavily loaded.

In addition, the tensioning is directly between the frame and bag members via the harness strap and webbing loops to insure such maintenance of the tensioning thereof and precluding any shifting of the straps as may occur in prior art approaches.

The provision of a minimum number of quick disconnect fasteners provides for relative ease of release of the bag from the harnesses for access to the filler gas cap 21 or for removal of the bag.

The resilient pad 56 may be of relatively minimal thickness and extends over the entire top surface of the tank and thus may be conveniently carried with the tank bag. The pad itself is configured to completely cushion the various fastener hardware elements from contacting the tank plate to minimize any tendency to mar the surface thereof.

The installation of the harness assembly itself is relatively simple and yet is readily adjusted to provide the appropriate tensioning of the bag for securing the same to vehicles of varying configurations. The entire assembly and mounting arrangement is very simple to enable manufacture at relatively low cost and to be of minimum complexity for ease in carrying out the installation procedure.

The embodiments of the invention in which an exclusive property or privilege is claimed are defined as follows:

1. A mounting arrangement for a motorcycle of the type having a gasoline tank mounted between the steering head and the seat thereof on the motorcycle frame, including a front frame portion intermediate said steering head and said gasoline tank at the forward edge thereof and rear frame portions extending adjacent the rear of said gasoline tank forward of said motorcycle seat, said mounting arrangement comprising:
   a first harness adapted to encircle one of said frame portions including a first harness strap having end portions thereof and including means retaining said ends thereof atop said gasoline tank in laterally spaced apart positions thereon;
   a second harness comprising a second harness strap encircling the other of said motorcycle frame;
   a plurality of fastener means elements, two secured to one of said first or second harness strap portions thereof and one secured to the other of said first or second harness straps;
   a motorcycle tank bag configured to fit atop said motorcycle gasoline tank and including a plurality of fastener means elements located in correspondence with and matable with said harness for fastener means elements secured to said first and second harness means, said bag and harness fastener elements being movable into mating relationship to secure said tank bag to said first and second harnesses whereby to produce the three-point support therefor.

2. The mounting arrangement according to claim 1 wherein said means for securing said end portions of said first harness strap comprises an elastic strap connectable thereto adapted to extend across said gasoline tank to position said end portions thereof.

3. The mounting arrangement according to claim 1 further including a resilient pad disposed beneath said motorcycle tank bag and means securing said pad thereto so that upon removal of said tank bag from said first and second harnesses, said pad is removed together therewith.

4. The mounting arrangement according to claim 3 wherein said means securing said pad to said bag comprises a series of webbing loops extending through slits formed into said resilient pad, said webbing loops further comprising means for securing said mating fastener means elements to said bag.

5. The mounting arrangement according to claim 4 wherein said resilient pad is configured with tab portions thereto located adjacent each of said webbing loops and extending outwardly from beneath said motorcycle tank bag and installed extending beneath said fastener means mating elements, whereby to cushion said elements from the surface of said gasoline tank.

6. The mounting arrangement according to claim 1 wherein each of said end portions of said first harness is provided with buckle means enabling tensioning thereof after installation of said tank bag, wherein said second harness strap end portion is provided with buckle means for tensioning said second harness after installation of said tank, said buckle means of said first harness and said second harness allowing tensioning to produce fore and aft and lateral tightening of said motorcycle tank bag.

7. The mounting arrangement according to claim 6 wherein said first harness is adapted to encircle the front frame portions of said motorcycle and wherein said second harness is adapted to encircle the rear frame portion of said motorcycle.

8. The mounting arrangement according to claim 1 wherein said fastening means comprises quick release mechanical fasteners having male and female elements wherein said male elements are secured to said first and second harnesses and said female elements are secured to said motorcycle tank bag.

9. The mounting arrangement according to claim 8 wherein said bag is of fabric construction and wherein said means mounting each of said female elements to said tank bag comprises loops sewn into said tank bag.

10. The mounting arrangement according to claim 1 wherein said two fastener elements are affixed to the front portion of said tank bag at laterally spaced points thereon and wherein said one fastener element mating with said second harness strap element comprises a centrally located fastener element secured to said tank bag to provide said three-point support thereof.

* * * * *

UNITED STATES PATENT AND TRADEMARK OFFICE
CERTIFICATE OF CORRECTION

PATENT NO. : 4,359,233

DATED : November 16, 1982

INVENTOR(S) : W. Shaun Jackson et al

It is certified that error appears in the above-identified patent and that said Letters Patent are hereby corrected as shown below:

Column 1, line 45 "bag" should be --gas--

Column 4, line 14 "tap" should be --tab--

Column 5, line 58 delete "for"

Column 6, line 19 "into" should be --in--

Column 6, line 24 "thereto" should be --thereof--

Signed and Sealed this

Twenty-second Day of March 1983

[SEAL]

Attest:

GERALD J. MOSSINGHOFF

Attesting Officer  Commissioner of Patents and Trademarks